(12) United States Patent
Tovilla et al.

(10) Patent No.: US 11,359,346 B2
(45) Date of Patent: Jun. 14, 2022

(54) MANHOLE APPARATUS

(71) Applicant: The Regional Municipality of Peel, Brampton (CA)

(72) Inventors: Edgardo Tovilla, Brampton (CA); Virginia Masut-Rowan, Mississauga (CA)

(73) Assignee: The Regional Municipality of Peel, Brampton (CA)

( * ) Notice: Subject to any disclaimer, the term of this patent is extended or adjusted under 35 U.S.C. 154(b) by 131 days.

(21) Appl. No.: 16/543,746

(22) Filed: Aug. 19, 2019

(65) Prior Publication Data
US 2021/0032832 A1 Feb. 4, 2021

Related U.S. Application Data

(60) Provisional application No. 62/881,503, filed on Aug. 1, 2019.

(51) Int. Cl.
*E02D 29/14* (2006.01)
*H02G 9/10* (2006.01)

(52) U.S. Cl.
CPC ..... *E02D 29/1463* (2013.01); *E02D 29/1418* (2013.01); *H02G 9/10* (2013.01); *E02D 29/1427* (2013.01)

(58) Field of Classification Search
CPC . E02D 29/14; E02D 29/1463; E02D 29/1418; E02D 29/1427; E02D 29/127

USPC .................................. 404/25, 26; 52/19, 20
See application file for complete search history.

(56) References Cited

U.S. PATENT DOCUMENTS

| 644,884 | A | * | 3/1900 | Wrigley | |
| 794,661 | A | * | 7/1905 | Clark | |
| 1,735,301 | A | * | 11/1929 | Short | H02G 1/08 254/134.3 FT |
| 4,228,990 | A | * | 10/1980 | Horvath | B08B 9/0433 15/104.33 |
| 2017/0089027 | A1 | * | 3/2017 | Haskins | E02D 29/127 |
| 2018/0058032 | A1 | * | 3/2018 | Harazim | E02D 29/1463 |

FOREIGN PATENT DOCUMENTS

| EP | 0317919 A1 * | 5/1989 |
| FR | 2983878 A1 * | 6/2013 |

* cited by examiner

*Primary Examiner* — Sunil Singh
(74) *Attorney, Agent, or Firm* — Ridout and Maybee LLP

(57) ABSTRACT

An apparatus for use with a manhole and a cable, and a method thereof, is provided. The apparatus comprises a frame having an opening and a coupling mechanism for releasably securing the frame about the manhole such that the opening communicates with the manhole. The apparatus also includes a bearing secured to the frame adjacent the opening, the bearing having a surface over which a cable may travel in a manner that reduces wear on the cable when the cable is fed into or drawn through the opening in the hole.

15 Claims, 10 Drawing Sheets

US 11,359,346 B2

MANHOLE APPARATUS

FIELD OF THE INVENTION

The present invention relates to the field of manholes, and in particular, a temporary apparatus for use with a manhole.

BACKGROUND OF THE INVENTION

Manhole covers for covering manholes are generally well known. When a manhole requires inspection and/or maintenance, the lid, often weighing more than 100 pounds, must be removed before any work can be done. The removal of the lid, however, results in an exposed opening as the work is being conducted. A number of prior art devices have attempted to address these issues. However, each has shortcomings relating to safety, ease of installation, and allowing for work efficiency.

SUMMARY OF THE INVENTION

Forming one aspect of the present invention is an apparatus for use with a manhole and a cable, the apparatus comprising:
 a frame having an opening and a coupling mechanism for releasably securing the frame about the manhole such that the opening communicates with the manhole; and
 a bearing secured to the frame adjacent the opening, the bearing having a surface over which a cable may travel in a manner that reduces wear on the cable when the cable is fed into or drawn through the opening in the manhole.

Another aspect of the present invention is a method for feeding or drawing a cable into a manhole with a frame having an opening and a bearing positioned adjacent the opening, the bearing having a surface over which the cable may travel in a manner that reduces wear on the cable, the method comprising:
 releasably securing the frame about the manhole such that the opening communicates with the manhole;
 directing the cable through the opening and into the manhole; and
 running the cable over the bearing as the cable is fed into or drawn from the manhole.

BRIEF DESCRIPTION OF THE DRAWINGS

The present will now be described by way of example only with reference to the following drawings in which.

DETAILED DESCRIPTION OF EMBODIMENTS

Figure 1:
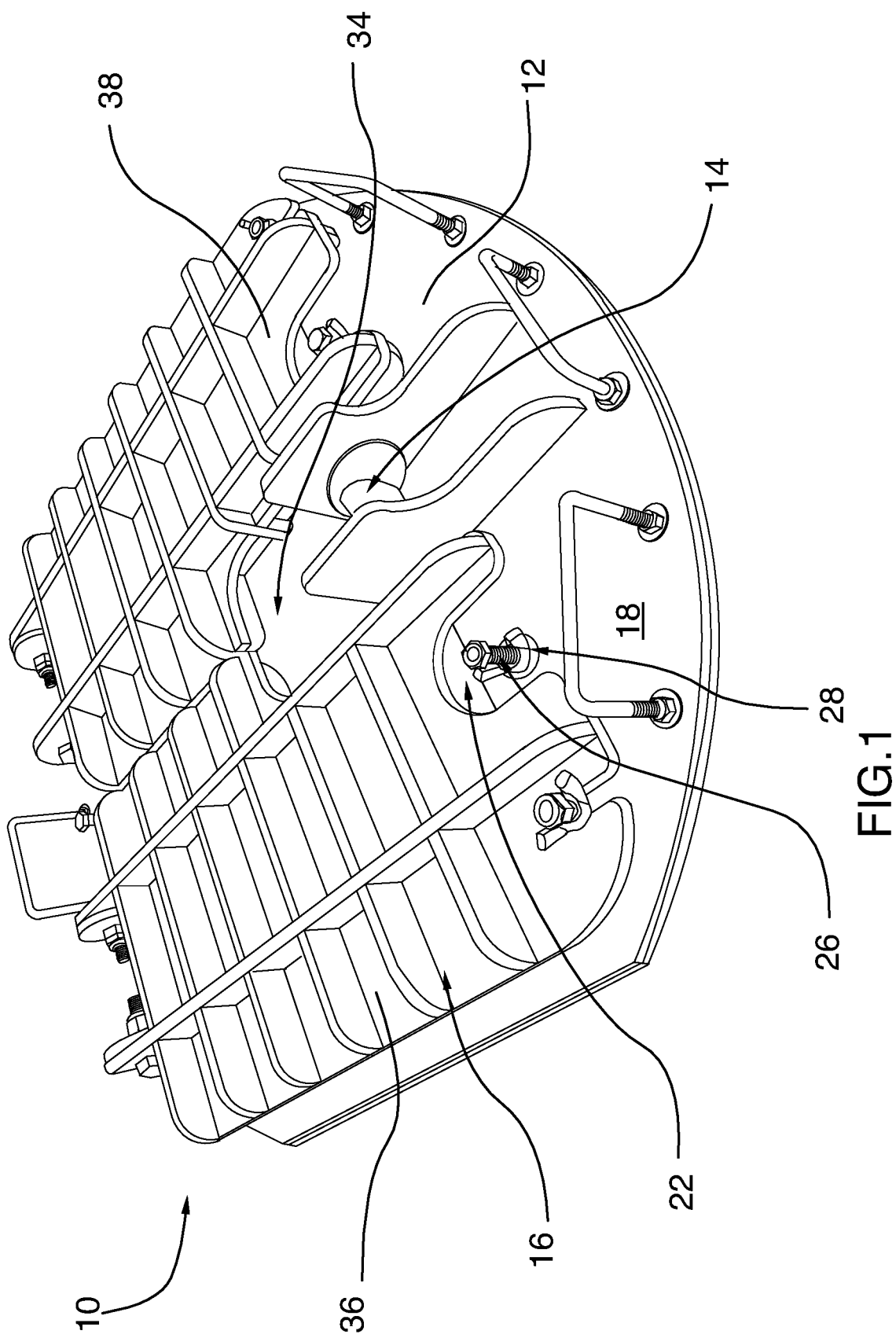
FIG. 1 is a top, front perspective view of an apparatus according to an exemplary embodiment of the present invention in a closed configuration.

Referring to FIGS. 1-4, there is shown an example of an apparatus 10 in isolation. Apparatus 10 of the exemplary embodiment consists of a frame 12, a bearing 14, and a cover 16.

In the depicted embodiment, frame 12 is flat with a top face 18 and an opposed bottom face 20. It is obround in shape and has a generally circular opening 22 therein. Frame 12 further includes a coupling mechanism 24 adapted to releasably securing apparatus 10 about a manhole. Coupling mechanism 24 in the present case comprises three L-bolts 26 that extend through frame 12. As shown, the body of L-bolts 26 are releasably secured to frame 12 by being threaded through frame 12 with the shorter arm of the L-bolt positioned proximate bottom face 20 and with a washer and a wing nut 28 coupled to each L-bolt adjacent top face 18.

Bearing 14 is secured to frame 12 adjacent opening 22 and has a surface 30. In the depicted embodiment, surface 30 of bearing 14 is cylindrical, forming a part of a grooved wheel or sheave. In the depicted embodiment, the sheave is firmly secured to frame 12 above opening 22.

Figure 2:
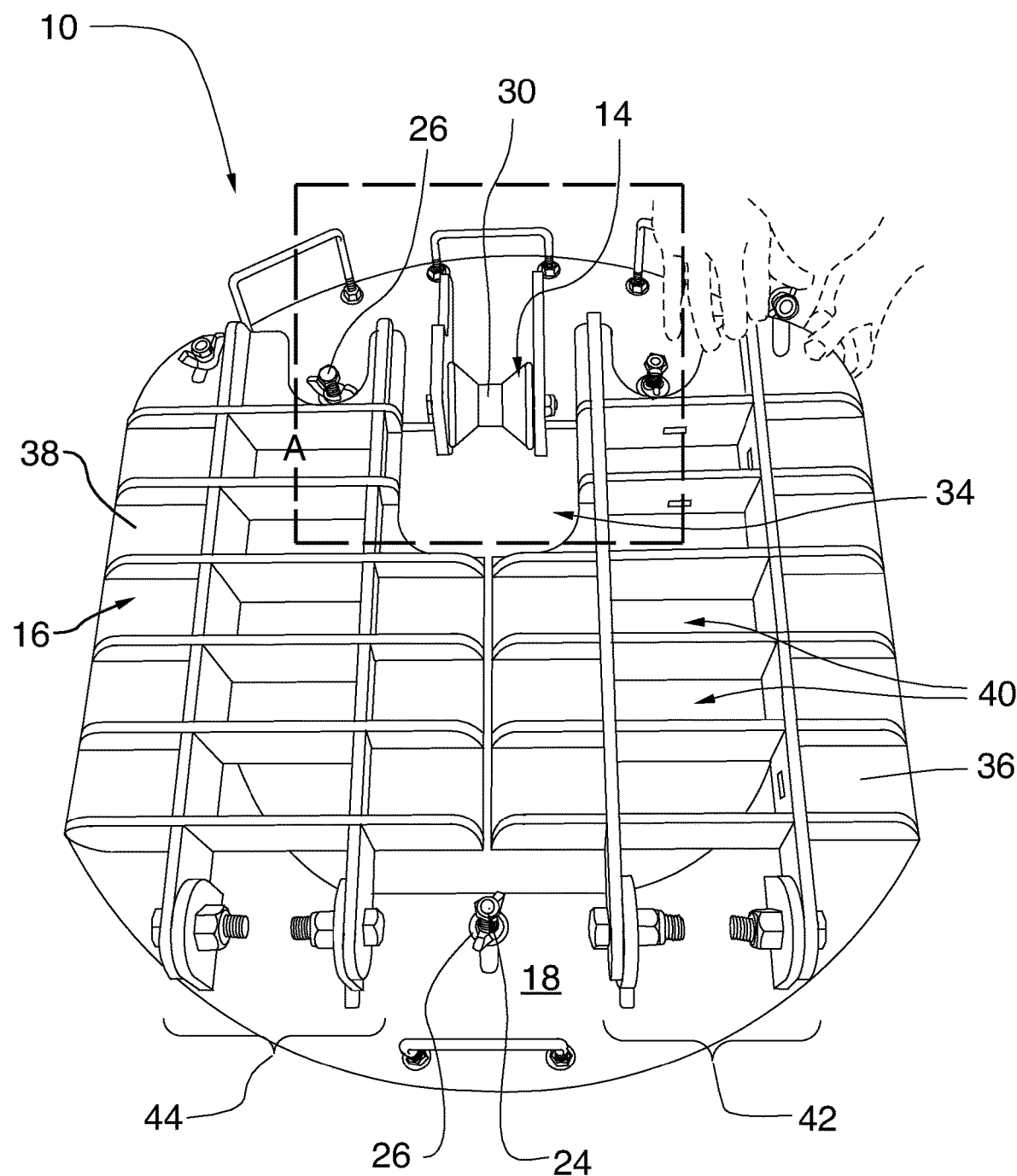
FIG. 2 is a plan view of the apparatus of FIG. 1.
Figure 3:
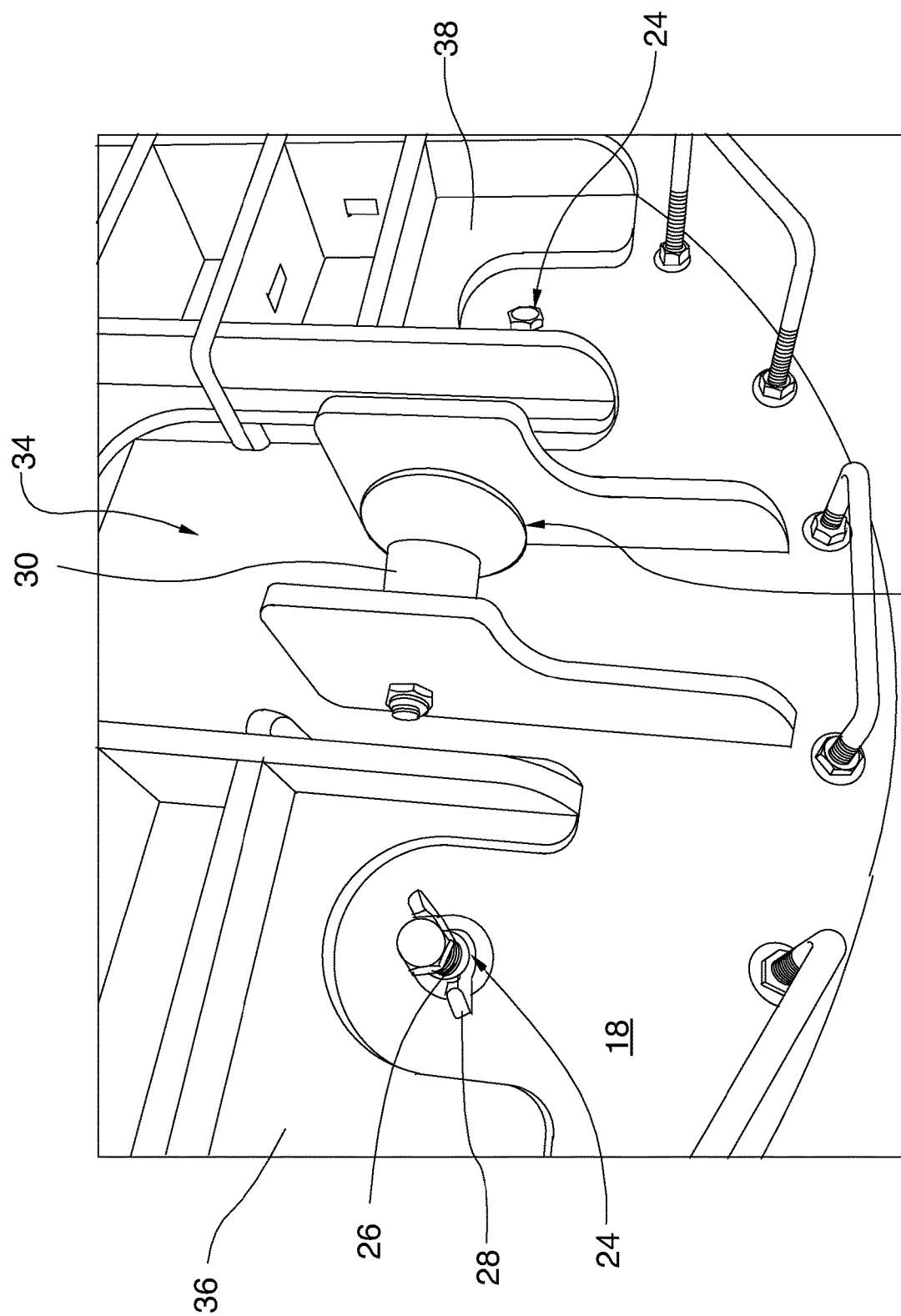
FIG. 3 is enlarged top perspective view of portion A of FIG. 2.
Figure 4:
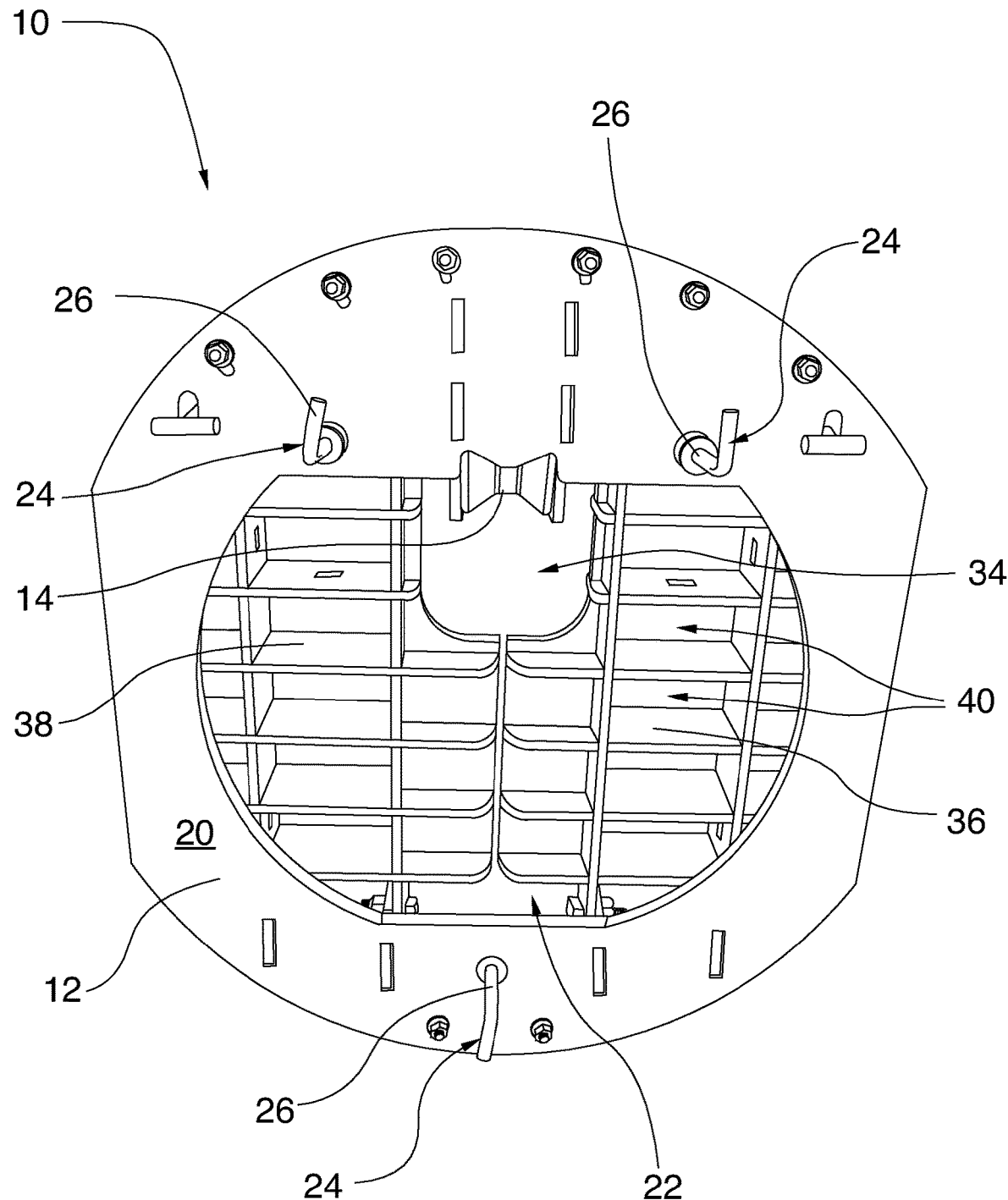
FIG. 4 is a bottom view of the apparatus of FIG. 1.

Cover 16 is pivotably secured to frame 12 between a closed configuration with cover 16 in covering relation over opening 22 (see FIGS. 1 and 2 for example). Cover 16 may also be positioned in an open configuration with cover 16 extending away from frame 12, thereby allowing access into through opening 22. Cover 16 further includes a suspension aperture or gap 34 that is positioned about bearing 14 when cover 16 is in the closed configuration.

In the depicted embodiment, cover 16 comprises two panels 36 and 38. Each panel is pivotably secured to frame 12 with a hinge 42, 44, respectively, between an open configuration and a closed configuration. Each panel 36, 38 is also dimensioned to cover only a portion of opening 22. For example, panel 36 and other panel 38 in the Figures are each dimensioned to cover half of opening 22. In this manner, cover 16 may be placed in a partially open configuration when one of the panels is in the open configuration and the other panel is in the closed configuration (see FIG. 5). Present panels 36, 38 are, thus, also shaped to collectively form suspension gap 34. In addition, cover 16 includes multiple apertures 40 to allow visual inspection through cover 16 when it is in the closed configuration.

Referring to FIGS. 5-10, there is shown an example of a method of use of apparatus 10 with a manhole 100 and a cable 104, the method for feeding or drawing cable 104 into manhole 100 with apparatus 10 such that cable 104 may travel in a manner that reduces wear on cable 104. Moreover, in the depicted embodiment, an object 102 is secured to cable 104 for suspension of object 102 from cable 104 down manhole 100.

Apparatus 10 is releasably secured about manhole 100 by first aligning opening 22 in frame 12 with manhole 100, such that opening 22 communicates with manhole 100.

Figure 5:
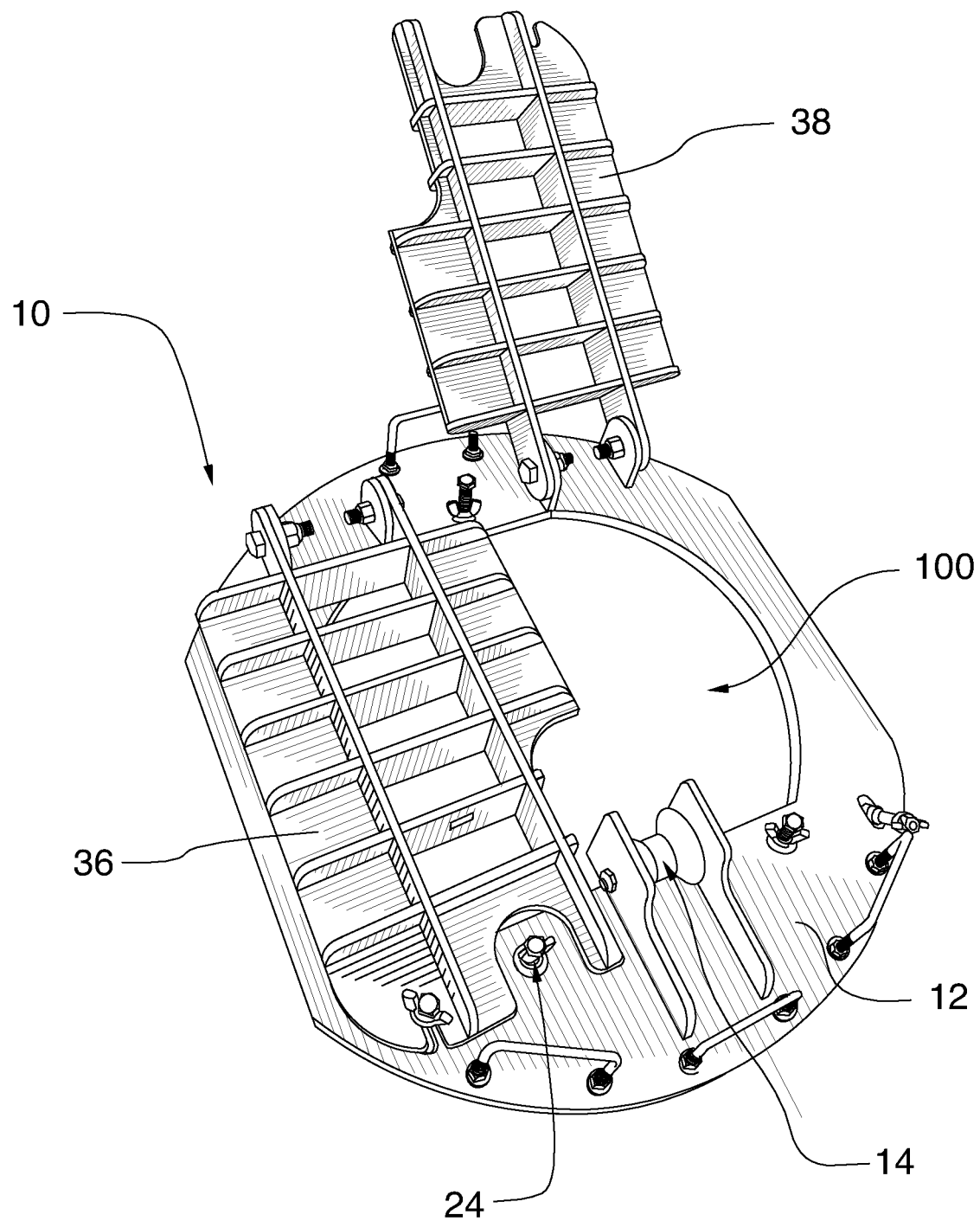
FIG. 5 is a top perspective view of the apparatus of FIG. 1 in use about a manhole in a partially open configuration.
Figure 6:
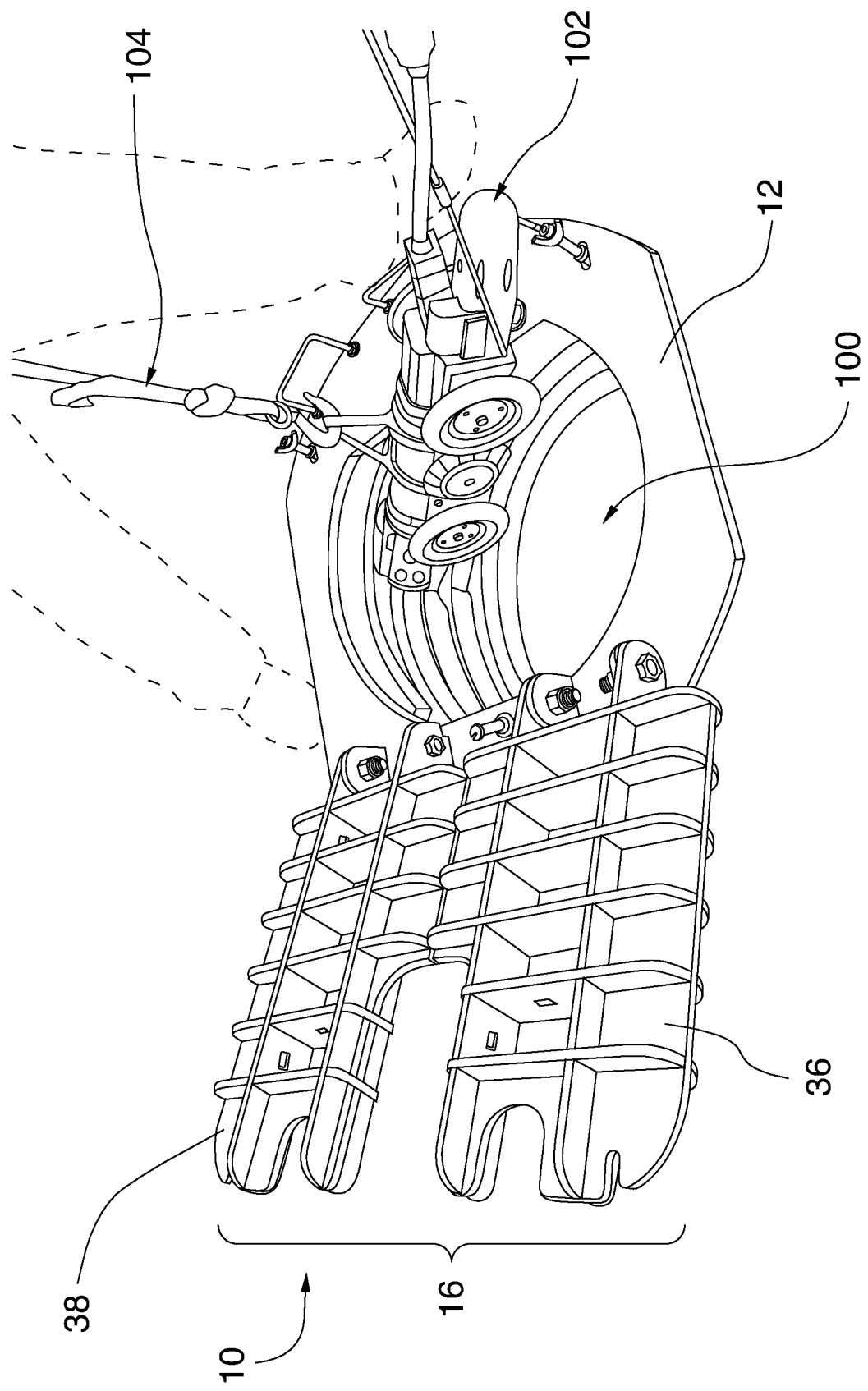
FIG. 6 is a side perspective view of the apparatus of FIG. 5 in an open configuration with an object being lowered into the manhole on a cable.
Figure 7:
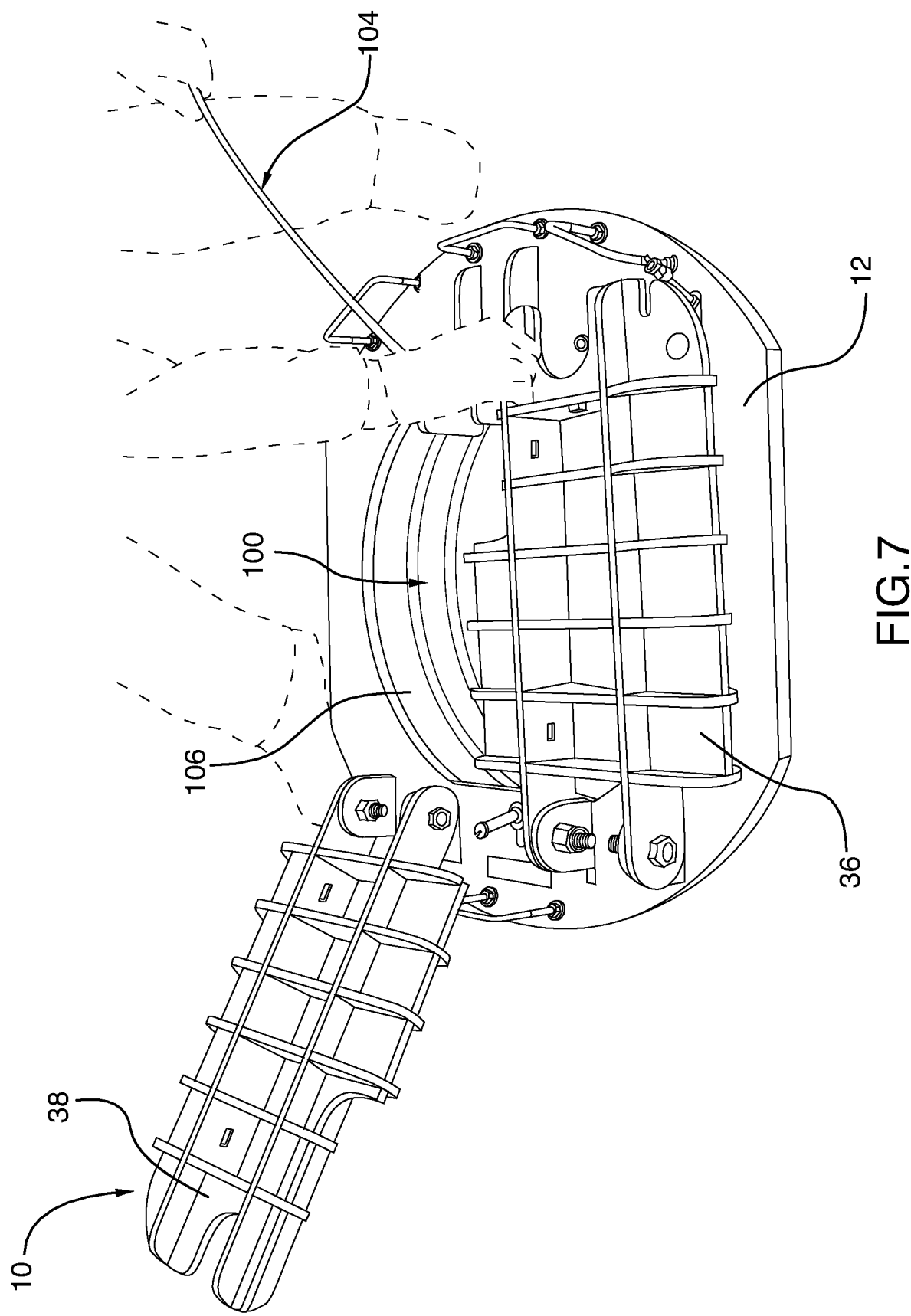
FIG. 7 is a side perspective view of the apparatus of FIG. 6 in a partially open configuration with the object suspended in the manhole on the cable.
Figure 8:
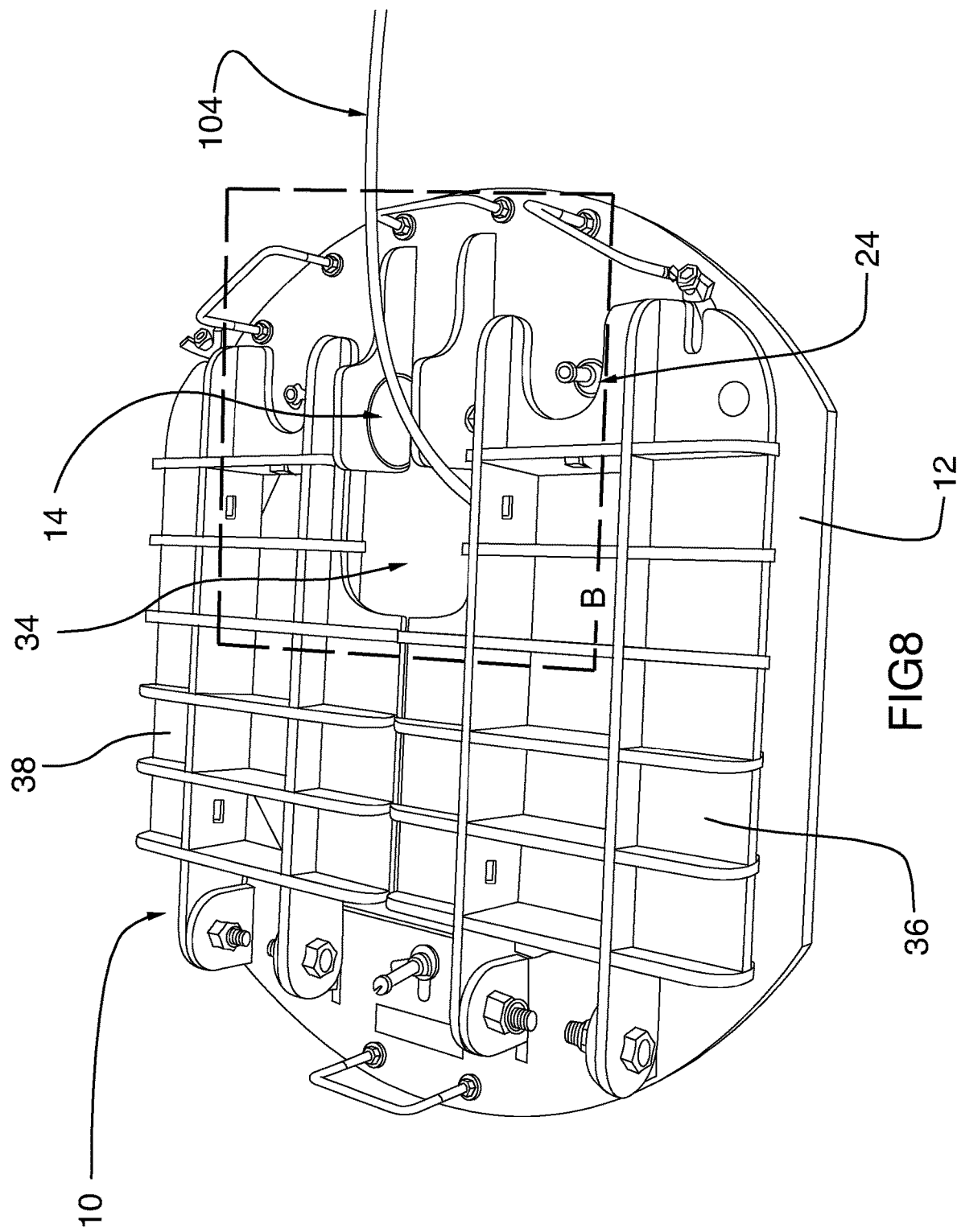
FIG. 8 is a side perspective view of the apparatus of FIG. 6 in a closed configuration with the object suspended in the manhole on the cable.
Figure 9:
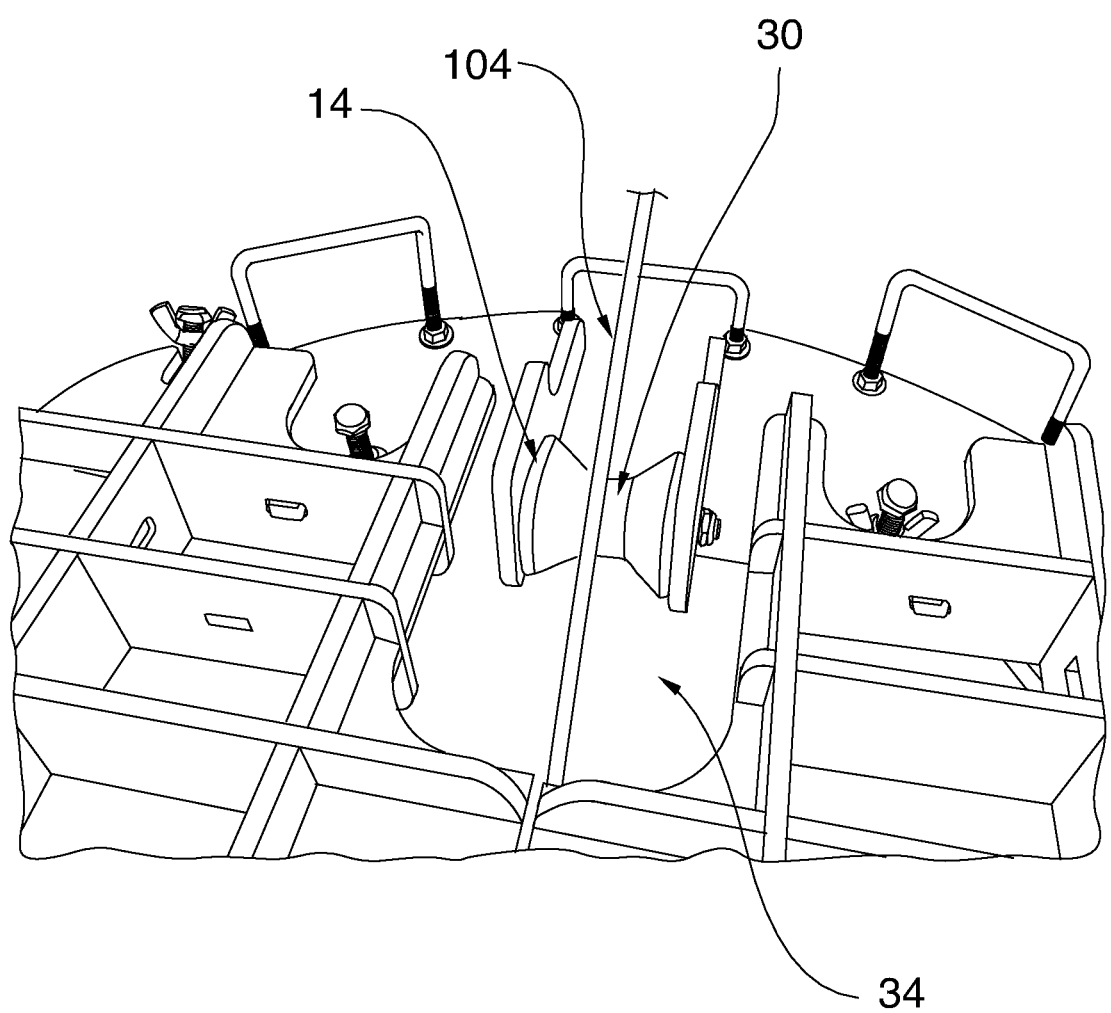
FIG. 9 is an enlarged, top perspective view of portion B of FIG. 8.

In the present case, manhole 100 has an internal lip 106 (see FIGS. 5 and 6). To releasably secure apparatus 10 to manhole 100, the short arms of L-bolts 26 are then hooked onto lip 106 and frame 12 is tightened about manhole 100 by rotating wing nuts 28. Panels 36, 38 may be opened or closed as necessary in order to allow a user to reach through opening 22 to ensure that L-bolts 26 are indeed engaged with lip 106 before they are tightened.

As shown in FIG. 6, once apparatus 10 is secured in place, with panels 36, 38 in the open configuration, object 102 (and cable 104) is directed through opening 22 and into manhole 100. Cable 104 is then placed onto surface 30 of bearing 14 to so cable 104 can run, or be fed, over bearing 14 and suspend object 102 in manhole 100 (see FIG. 9).

Cover 16/panels 36, 38 may then be pivoted into the closed configuration while the cable is running over bearing 14. Alternately, only one panel 36 or 38 may be pivoted into the closed configuration to put cover 16 in the partially open configuration, see FIGS. 7 and 8 for example.

Once the required work is completed, cable 104 may be retracted or drawn over bearing 14 and one or both of panels 36, 38 are pivoted into the open configuration to pull object 102 from manhole 100. Wing nuts 28 are then loosened to disengage L-bolts 26 from lip 106. Apparatus 10 is pulled from manhole 100 and a manhole cover may be placed back into position over manhole 100.

An advantage of the present apparatus is that because suspension gap 34 is shaped and dimensioned to surround bearing 14, cable 104 can run past bearing 14 without contacting cover 16.

Another advantage of the present apparatus is that the low-friction surface of the bearing allows cable 104 to run over bearing 14 with minimal friction, reducing wear on cable 104 as object 102 is lowered into and raised from manhole 100, prolonging its useful life.

Figure 10:
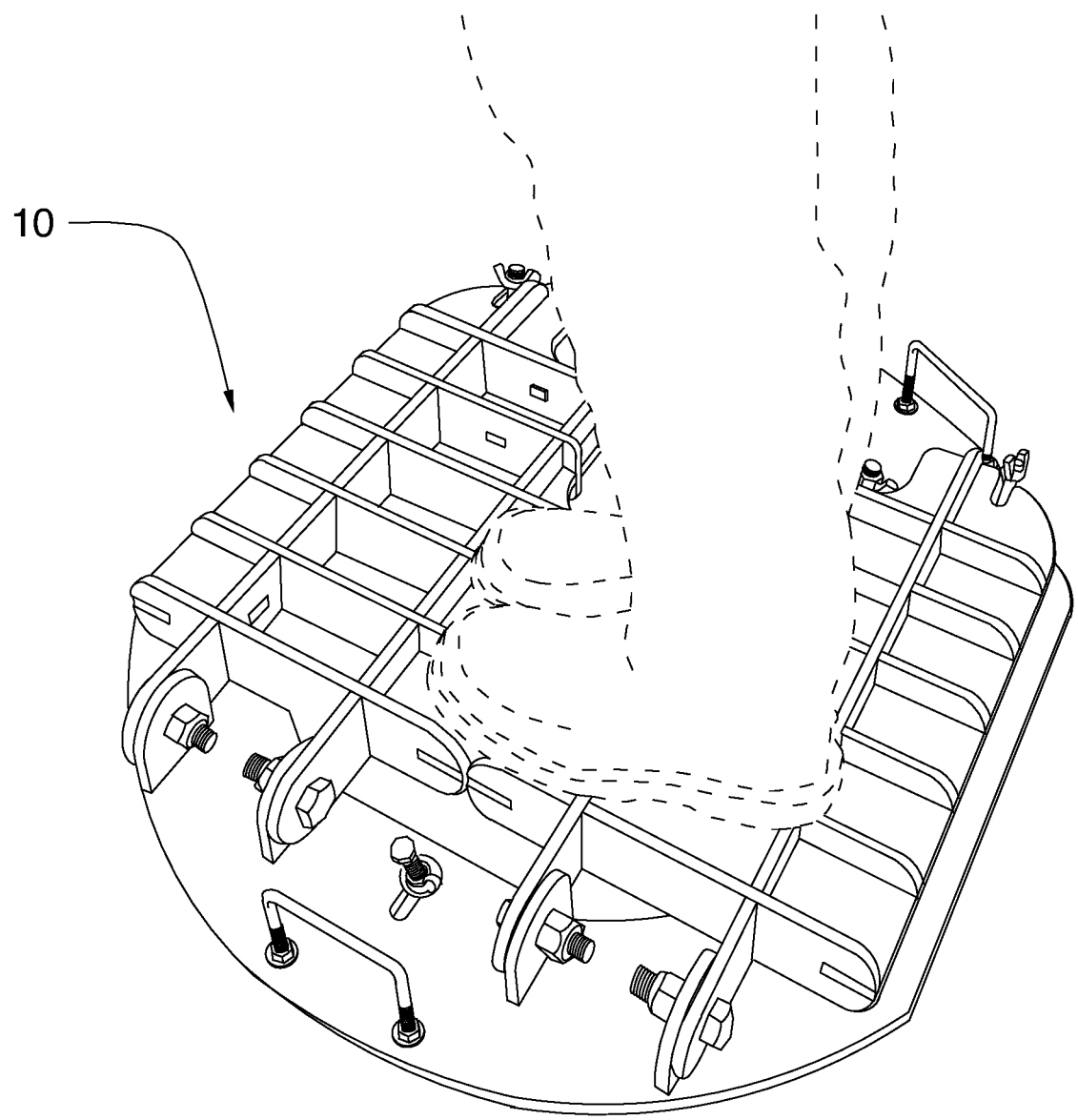
FIG. 10 is an alternate top perspective view of the apparatus of FIG. 6

A further advantage of the present apparatus is that manhole 100 can be covered to prevent humans, animals, and other larger objects from falling into an exposed manhole when work is being done on or within the manhole (see FIG. 10 for example).

A yet further advantage of the present apparatus is that cover 16 includes multiple apertures 40 which allow visual inspection of at least a portion of manhole 100 through cover 16 even when it is in the closed configuration.

It should be apparent to persons skilled in the arts that various modifications and adaptation of the structure and method described above are possible without departure from the invention.

For example, whereas the exemplary embodiment includes bearing 14 that is firmly fixed to frame 12, it is evident that bearing 14 may alternately be rotatably secured to frame 12.

In another example, whereas cover 16 includes two panels 36, 38, it is evident that cover 16 may alternately be a single panel.

It should be apparent to persons skilled in the arts that various modifications and adaptation of this structure described above are possible without departure from the scope of the present subject matter defined in the appended claims as purposively construed.

The invention claimed is:

1. An apparatus for use with a manhole and a cable, the apparatus comprising:
a frame having an opening and a coupling mechanism for releasably securing the frame about the manhole such that the opening communicates with the manhole; and
a bearing secured to a first top surface at a first end of the frame adjacent the opening, the bearing having a surface over which a cable may travel in a manner that reduces wear on the cable when the cable is fed into the manhole or drawn through the opening from the manhole, wherein the bearing is positioned above the opening; and
a cover pivotably secured to a second top surface at a second end of the frame, between a closed configuration with the cover in covering relation over the opening, and an open configuration, wherein the second end is substantially opposite to the first end.

2. The apparatus of claim 1, wherein the bearing is cylindrical.

3. The apparatus of claim 2, wherein the bearing is a sheave.

4. The apparatus of claim 3, wherein the bearing is rotationally secured to the frame.

5. The apparatus of claim 1, wherein the cover has a suspension gap that is positioned about the bearing when the cover is in the closed configuration.

6. The apparatus of claim 1, wherein the cover comprises a panel pivotably secured to the frame with a hinge between the open configuration and the closed configuration, the panel being dimensioned to cover a portion of the opening.

7. The apparatus of claim 6, wherein the cover further comprises another panel pivotably secured to the frame with another hinge between the open configuration and the closed configuration, the other panel being dimensioned to cover another portion of the opening.

8. The apparatus of claim 7, wherein the cover further has a partially open configuration when the panel is in the open configuration and the other panel is in the closed configuration or vice versa.

9. The apparatus of claim 8, wherein the panel and the other panel collectively form a suspension gap.

10. The apparatus of claim 9, wherein the panel and the other panel are each dimensioned to cover half of the opening.

11. The apparatus of claim 10, wherein the cover further comprises multiple apertures to allow visual inspection of the manhole through the cover in the closed configuration.

12. The apparatus of claim 11, wherein the coupling mechanism comprises an L-bolt extending from the frame, the L-bolt being releasably secured to the frame for engaging with an internal lip in the manhole.

13. A method for feeding or drawing a cable into a manhole with a frame having an opening and a bearing positioned adjacent the opening on a first top surface at a first end of the frame, the bearing having a surface over which the cable may travel in a manner that reduces wear on the cable, the method comprising:
releasably securing, using a coupling mechanism, the frame about the manhole such that the opening communicates with the manhole;
directing the cable through the opening and into the manhole; and
running the cable over the bearing as the cable is fed into or drawn from the manhole, wherein the bearing is positioned above the opening, and wherein a cover pivotably secured to a second top surface at a second end of the frame between a closed configuration with the cover in covering relation over the opening, and an open configuration, wherein the second end is substantially opposite to the first end.

14. The method of claim 13, wherein the frame further comprises the cover having a suspension gap, the cover pivotably secured to the frame between the open configuration and the closed configuration when the suspension gap is positioned about the bearing, wherein an object releasably secured to the cable is directed through the opening when the cover is in the open configuration; and the method-further comprising:

pivoting the cover into the closed configuration while the cable is running over the bearing.

15. The method of claim 14, wherein the cover includes a panel pivotably secured to the frame with a hinge, the panel being dimensioned to cover a portion of the opening; and another panel pivotably secured to the frame with another hinge, the another panel being dimensioned to cover another portion of the opening;

wherein pivoting the cover comprising pivoting the panel into the closed configuration while leaving the another panel in the open configuration.

\* \* \* \* \*